Patented Aug. 20, 1929.

1,725,084

UNITED STATES PATENT OFFICE.

FRANK A. McDERMOTT, OF CLAYMONT, DELAWARE, ASSIGNOR TO EASTERN ALCOHOL CORPORATION, OF WILMINGTON, DELAWARE, A CORPORATION OF DELAWARE.

PROCESS OF PRODUCING FUSEL OIL BY FERMENTATION.

No Drawing. Application filed November 8, 1927. Serial No. 231,992.

This invention relates to the production of fusel oil by fermentation, and more particularly to increasing the yield of such oil by fermentations which are brought about by organisms of the ordinary Saccharomyces type.

In the ordinary Saccharomyces fermentation of a medium such as molasses or saccharified grain mash, every 100 pounds of fermentable hexose sugar yields theoretically about 49.6 pounds of 100% alcohol and 3 pounds of glycerol, the remainder of the sugar going to carbon dioxide. Practically, the yield of alcohol is less than this owing to various side reactions such as, for example, the utilization of a portion of the sugar in the formation or growth of new yeast cells. At the same time, there is also produced the so-called "fusel oil", consisting of a mixture of higher alcohols—propyl iso-butyl, amyl, iso-amyl, etc. These higher alcohols are not produced from the sugar, but, as has been shown by Felix Ehrlich, are the result of the action of the yeast on the ordinary alpha-amino acids present in the mash as digestion or decomposition products of proteins; thus, one of these acids, leucine, $(CH_3)_2 \cdot CH \cdot CH_2 \cdot CH(NH_2) \cdot CO \cdot OH$, yields amyl alcohol in accordance with the equation

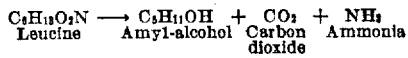
$$C_6H_{13}O_2N \longrightarrow C_5H_{11}OH + CO_2 + NH_3$$
Leucine   Amyl-alcohol  Carbon   Ammonia
                        dioxide The carbon dioxide is released as such and escapes from the solution, while the amyl alcohol remains in the mash. The ammonia does not appear as such, but is immediately used as a source of nitrogen by the growing yeast.

An object of this invention is to increase the yield of fusel oil in fermentation processes. A further object of this invention is the production of fusel oil by the digestion of the protein products already present in the mash by the excreted protease of the adjunct yeast, thus requiring no addition of other nitrogenous substances to the mash. Other objects will appear hereinafter.

It is known that the Saccharomyces yeasts are not able to utilize as sources of nitrogen, products which are not diffusible, i. e., which cannot pass through the cell wall into the interior of the yeast cells, as its proteoclastic enzymes are "endo-enzymes" and are not excreted into the medium in which the yeast is growing. For this reason, the production of fusel oil during their fermentation cannot exceed that theoretically derivable from the amino-acids and lower polypeptids already present in the mash. Ordinarily, this production amounts to 0.3% to 0.6% of the alcohol produced.

Other types of yeast fungi, however, are known which excrete their proteoclastic enzymes into the medium in which they are growing, and hence cannot be conveniently cultured on gelatin media owing to the fact that they digest and liquefy this medium. Among these yeast is that known as *Willia anomala* (also sometimes called *Saccharomyces anomalus*). Similar or related yeasts are variously known as "film yeast," "surface yeasts", "Kahmhefe", "Mycoderma", "Ester-yeasts", etc., and are frequently met with as contaminations in fermentations not conducted under pure culture conditions, and are usually regarded as very deleterious to the fermentation. *Willia anomala* is one of the best known individual species of this group. It forms a dry, white, wrinkled film on the surface of sugar solutions and other appropriate media, and produces a fairly active fermentation, accompanied by a fruity odor suggesting ethyl acetate. If the fermented medium is allowed to stand long enough with access of air, it may completely oxidize the alcohol, ester, and acetic acid it formed at first, leaving the solution "flat" and musty. It liquefies gelatin media slowly, but does not attack agar. It does not grow in alkaline media so far as has been observed. It is strongly aerobic by preference. When growing as a surface film, the cells are usually long and narrow; growth in the liquid is as small, round or broadly elliptic cells.

I have found that this yeast may be grown in acid media, such as a solution of one part of cane molasses in three or four parts of water (by weight), or in acid fruit juices, or in acidified solutions of dextrose or invert sugar containing small amounts of nitrogenous substances such as peptone, or in saccharified grain (malt, corn, etc.) mashes and in these it will produce its characteristic fermentation. I have also found further that if the solution is aerated slowly, fermentation is much more rapid, while the production of ester is practically suppressed. Of special importance is the fact that during this fermentation, an amount of fusel oil is produced much in excess of that obtained from an ordinary fermentation. It may be used together with the ordinary Saccharomyces yeasts, as a "mixed" fermentation.

The following examples indicate by way of illustration methods by which my invention may be carried out:

*Example 1.*—4000 grams of cane molasses containing about 55% of sugar is dissolved in 10 liters of water and sterilized at 5 to 8 pounds steam pressure for one half hour. After cooling to 30° C. the mash is seeded with 250 c. c. of a culture in a similar solution of *Willia anomala*, 48 to 76 hours old, and a slow current of air injected at the bottom of the fermenter. Fermentation is complete at the end of 4 or 5 days, and on distillation, the following products may be obtained:

Ethyl alcohol (95% by volume)_ 1100–1150
Acetaldehyde _____ Trace.
Fusel oil _____ 20–25 c. c.

The residue contains some acetic acid and glycerol. In an ordinary yeast fermentation, the fusel oil obtainable would be about 6 or 7 c. c.

The following table shows the results of analysis of aerated and non-aerated mashes, the figures representing percents of the total reducing sugar (as invert) initially present:

| | Non-aerated | Aerated |
|---|---|---|
| Ethyl alcohol | 38. to 40. | 35. to 36. |
| Ethyl acetate | 2. to 4. | None |
| Fusel oil | 0.5 | 0.8 |
| Glycerol | 6. to 7. | Not determined |
| Acetic acid | 3. | Not determined |
| Residual reducing substances calculated as invert sugar | 8. | 7.5 |
| Acetaldehyde | None observed. | Trace. |

*Example 2.*—Mash similar to that of Example 1. After cooling to 30° C. it is inoculated with 125 c. c. of a 24 to 48 hour aerated culture of *Willia anomala*, and a slow current of air injected as in Example 1. After 24 hours, the aeration is discontinued, and 125 c. c. of a culture of molasses distillery yeast added. Fermentation is complete in 3 to 4 days, and on distillation, the following products may be obtained:

Ethyl alcohol (95% by volume)
_____ 1200–1250 c. c.
Acetaldehyde _____ Trace.
Fusel oil _____ 20–25 c. c.

The residue contains small amounts of acetic acid, and glycerol equivalent to about 3 or 4% of the fermented sugar.

The temperature of fermentation is not especially critical, but satisfactory results may be obtained between 25° and 35° C.

Without aeration, fermentation is much slower and other products, such as ethyl acetate and acetic acid are formed.

I am aware that it has been proposed to increase the yield of so-called fusel oil, by the simultaneous growth in the mash of organisms of the *Bacillus butylicus* type, which convert a portion of the sugar to butyl alcohol and acetone, or of the *B. macerans* type, which produce ethyl alcohol and acetone, and also that the addition to a fermenting mash of protein decomposition products obtained by the action of proteoclastic organisms or their enzymes, e. g., *Aepergillus oryzæ*, or *Takadiastase*) or by the action of hydrolyzing catalysts (e. g. the acid digestion or hydrolysis products of leather scrap or other protein wastes), in order to increase the yield of fusel oil. These processes have, however, been unsuccessful or uneconomical. It has also been proposed, in the ordinary fermentation, to increase the yield of fusel oil by pre-culture of the yeast in a medium of very low concentration of available nitrogenous material, and then to ferment with this yeast a mash relatively high in amino-acids. These processes have nothing in common with the herein-described process, as no addition of other nitrogenous substances is made to the mash, the increased fusel oil yield depending solely on the digestion of the protein products already in the mash by the excreted protease of the adjunct (Willia) yeast. The alcohol and fusel oil may be recovered by the ordinary commercial methods.

By the term "acid molasses mash medium" as used herein, I mean to include cane molasses which has a natural acidity, or it may include an acidified beet molasses medium.

As many apparently widely different embodiments of this invention may be made without departing from the spirit thereof, it is to be understood that I do not intend to be limited by my invention except as indicated in the appended claims.

I claim:

1. The process of producing an alcohol rich in fusel oil which comprises sterilizing an acid molasses or other carbohydrate-protein mash medium, and causing the fermentation of the medium with the herein-described organism *Willia anomala*.

2. The process of producing an alcohol rich in fusel oil which comprises sterilizing an acid molasses or other carbohydrate-protein mash medium, cooling the medium to the optimum temperature, inoculating the medium with the herein-described organism *Willia anomala*, and causing the medium to ferment.

3. The process of producing fusel oil and alcohol, which comprises sterilizing an acid molasses or other carbohydrate-protein mash medium, cooling the medium to the optimum temperature, and inoculating the medium with the herein-described organism *Willia anomala*, the medium to ferment, and aerating the medium.

4. The process of producing fusel oil and alcohol, which comprises sterilizing an acid molasses or other carbohydrate-protein mash medium, inoculating the medium with the herein-described organism *Willia anomala* and a culture of ordinary Saccharomyces yeast, and the medium to ferment.

5. The process of producing fusel oil and alcohol, which comprises sterilizing an acid molasses or other carbohydrate-protein mash medium, inoculating the medium with the herein-described organism *Willia anomala* and a culture of ordinary Saccharomyces yeast, aerating the medium, and the medium to frement by the action of said organism and said yeast.

6. The process of producing fusel oil and alcohol, which comprises sterilizing an acid molasses or other carbohydrate-protein mash medium, cooling the medium to the optimum temperature, and causing the fermentation of the medium with cultures of yeast fungi capable of excreting their proteoclastic enzymes into the medium.

7. The process of producing fusel oil and alcohol, which comprises sterilizing an acid molasses or other carbohydrate-protein mash medium, cooling the medium to the optimum temperature, causing the fermentation of the medium with cultures of yeast fungi capable of excreating their proteoclastic enzymes into the medium, and with cultures of regular distillery yeast.

8. The process of producing fusel oil and alcohol, which comprises sterilizing an acid molasses or other carbohydrate-protein mash medium, cooling the medium to the optimum temperature, causing the fermentation of the medium with cultures of yeast fungi capable of excreting their proteoclastic enzymes into the medium, and with cultures of regular distillery yeast, and aerating the medium.

9. The process of producing fusel oil and alcohol, which comprises sterilizing an acid molasses or other carbohydrate-protein mash medium, cooling the medium to the optimum temperature, inoculating the medium with a culture of *Willia anomala*, adding cultures of regular distillery yeast to the medium, aerating the medium, and permitting the mixture to ferment.

10. The process of producing fusel oil and alcohol, which comprises sterilizing an acid molasses or other carbohydrate-protein mash medium, cooling the medium to the optimum temperature, inoculating the medium with cultures of yeast fungi capable of excreting their proteoclastic enzymes into the medium, adding cultures of regular distillery yeast to the medium, aerating the medium, and permitting the mixture to ferment.

In testimony whereof, I affix my signature.

FRANK A. McDERMOTT.

CERTIFICATE OF CORRECTION.

Patent No. 1,725,084.   Granted August 20, 1929, to

FRANK A. McDERMOTT.

It is hereby certified that error appears in the printed specification of the above numbered patent requiring correction as follows: Page 2, lines 28 to 40, strike out the paragraph beginning with "The following table, etc" and insert the same to follow after line 64; same page line 129, claim 3, after the word "anomala" insert the word "causing"; page 3, line 7, claim 4, after the word "and" insert the word "causing"; line 14, claim 5, after the word "and" insert the word "causing", and line 15, for the misspelled word "frement" read "ferment"; line 50, claim 9, and lines 60 and 61, claim 10, for the word "permitting" read "causing"; and that the said Letters Patent should be read with these corrections therein that the same may conform to the record of the case in the Patent Office.

Signed and sealed this 29th day of October, A. D. 1929.

(Seal)

M. J. Moore,
Acting Commissioner of Patents.

4. The process of producing fusel oil and alcohol, which comprises sterilizing an acid molasses or other carbohydrate-protein mash medium, inoculating the medium with the herein-described organism *Willia anomala* and a culture of ordinary Saccharomyces yeast, and the medium to ferment.

5. The process of producing fusel oil and alcohol, which comprises sterilizing an acid molasses or other carbohydrate-protein mash medium, inoculating the medium with the herein-described organism *Willia anomala* and a culture of ordinary Saccharomyces yeast, aerating the medium, and the medium to frement by the action of said organism and said yeast.

6. The process of producing fusel oil and alcohol, which comprises sterilizing an acid molasses or other carbohydrate-protein mash medium, cooling the medium to the optimum temperature, and causing the fermentation of the medium with cultures of yeast fungi capable of excreting their proteoclastic enzymes into the medium.

7. The process of producing fusel oil and alcohol, which comprises sterilizing an acid molasses or other carbohydrate-protein mash medium, cooling the medium to the optimum temperature, causing the fermentation of the medium with cultures of yeast fungi capable of excreating their proteoclastic enzymes into the medium, and with cultures of regular distillery yeast.

8. The process of producing fusel oil and alcohol, which comprises sterilizing an acid molasses or other carbohydrate-protein mash medium, cooling the medium to the optimum temperature, causing the fermentation of the medium with cultures of yeast fungi capable of excreting their proteoclastic enzymes into the medium, and with cultures of regular distillery yeast, and aerating the medium.

9. The process of producing fusel oil and alcohol, which comprises sterilizing an acid molasses or other carbohydrate-protein mash medium, cooling the medium to the optimum temperature, inoculating the medium with a culture of *Willia anomala*, adding cultures of regular distillery yeast to the medium, aerating the medium, and permitting the mixture to ferment.

10. The process of producing fusel oil and alcohol, which comprises sterilizing an acid molasses or other carbohydrate-protein mash medium, cooling the medium to the optimum temperature, inoculating the medium with cultures of yeast fungi capable of excreting their proteoclastic enzymes into the medium, adding cultures of regular distillery yeast to the medium, aerating the medium, and permitting the mixture to ferment.

In testimony whereof, I affix my signature.

FRANK A. McDERMOTT.

CERTIFICATE OF CORRECTION.

Patent No. 1,725,084.          Granted August 20, 1929, to

FRANK A. McDERMOTT.

It is hereby certified that error appears in the printed specification of the above numbered patent requiring correction as follows: Page 2, lines 28 to 40, strike out the paragraph beginning with "The following table, etc" and insert the same to follow after line 64; same page line 129, claim 3, after the word "anomala" insert the word "causing"; page 3, line 7, claim 4, after the word "and" insert the word "causing"; line 14, claim 5, after the word "and" insert the word "causing", and line 15, for the misspelled word "frement" read "ferment"; line 50, claim 9, and lines 60 and 61, claim 10, for the word "permitting" read "causing"; and that the said Letters Patent should be read with these corrections therein that the same may conform to the record of the case in the Patent Office.

Signed and sealed this 29th day of October, A. D. 1929.

(Seal)

M. J. Moore,
Acting Commissioner of Patents.